United States Patent
Weaver

(10) Patent No.: US 12,018,618 B1
(45) Date of Patent: Jun. 25, 2024

(54) MOUNTING ARRANGEMENT FOR A TENSION MEMBER DRIVEN SYSTEM

(71) Applicant: PRATT & WHITNEY CANADA CORP., Longueuil (CA)

(72) Inventor: Paul Weaver, Chateauguay (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/349,252

(22) Filed: Jul. 10, 2023

(51) Int. Cl.
F02C 7/32 (2006.01)

(52) U.S. Cl.
CPC .......... *F02C 7/32* (2013.01); *F05D 2220/323* (2013.01); *F05D 2220/76* (2013.01); *F05D 2260/4021* (2013.01)

(58) Field of Classification Search
CPC .. F02C 7/32; F05D 2220/323; F05D 2220/76; F05D 2260/4021
See application file for complete search history.

(56) References Cited

U.S. PATENT DOCUMENTS

| | | | |
|---|---|---|---|
| 1,396,966 A | 11/1921 | Lyon et al. | |
| 4,157,013 A * | 6/1979 | Bell, III | F01D 21/045 60/39.512 |
| 5,269,662 A * | 12/1993 | Denton | F04B 35/00 417/362 |
| 7,886,544 B2 * | 2/2011 | Koenig | B64D 35/00 416/245 A |

FOREIGN PATENT DOCUMENTS

EP 2573423 B1 9/2016

* cited by examiner

*Primary Examiner* — Lorne E Meade
(74) *Attorney, Agent, or Firm* — NORTON ROSE FULBRIGHT CANADA LLP

(57) ABSTRACT

An aircraft engine comprises a rotor, an engine case having first and second mounting brackets projecting from an exterior surface thereof, an auxiliary engine system. The system includes an electric machine, a belt drive operatively coupled to the rotor, and a gearbox operatively coupled between the belt drive and the electric machine. The gearbox has a gearbox case with a cradle integrated thereto. The gearbox case and the cradle forms a monolithic body. The monolithic body is pivotally mounted to the first and second mounting brackets. A link is provided between the engine case and the monolithic body. A length of the link is adjustable to adjust a tension of the belt drive by setting an angular position of the monolithic body relative to the engine case.

20 Claims, 7 Drawing Sheets

MOUNTING ARRANGEMENT FOR A TENSION MEMBER DRIVEN SYSTEM

TECHNICAL FIELD

The disclosure relates generally to an aircraft powerplant and, more particularly, to a system for mounting a tension member driven component to a gas turbine engine structure.

BACKGROUND

An aircraft powerplant may include various components mounted to an exterior of a gas turbine engine. An electric machine, for example, may be mounted to a case of the gas turbine engine. This electric machine may receive or transmit power through a belt drive with a tensioning device. Arrangements are known in the art for coupling an electric machine to an engine rotor such as a propeller. While these known arrangements have various benefits, there is still room in the art for improvement.

SUMMARY

In one aspect, there is provided an assembly for an aircraft engine, comprising: an engine case having an exterior surface with a first and a second mounting bracket projecting from the exterior surface; a rotor next to the engine case; an auxiliary engine system including: an electric machine, a belt drive operatively coupled to the rotor, and a gearbox operatively coupled between the belt drive and the electric machine, the gearbox having a gearbox case with a cradle integrated thereto, the gearbox case and the cradle forming a monolithic body, the monolithic body pivotally mounted to the first and second mounting brackets; an adjustment link between the engine case and the monolithic body, a length of the adjustment link adjustable to adjust a tension of the belt drive by setting an angular position of the monolithic body relative to the engine case.

In another aspect, there is provided an assembly for an aircraft propulsion system, comprising: an engine case housing a turbine; a rotor drivingly connected to the turbine for rotation about an engine axis; and an auxiliary engine system externally mounted to the engine case, the auxiliary engine system comprising an electric machine, a gearbox operatively connected to the electric machine, a belt drive operatively connecting the gearbox to the rotor; wherein a cradle is integrated to a gearbox case of the gearbox to form therewith a monolithic body, the monolithic body pivotally mounted to the engine case for pivotal movement about a pivot axis, and wherein an adjustable link is connected at a first end to the engine case and at a second end to the monolithic body at a location spaced from the pivot axis, a length of the adjustable link adjustable to adjustably set an angular position of the monolithic body about the pivot axis.

DESCRIPTION OF THE DRAWINGS

Reference is now made to the accompanying figures in which.

DETAILED DESCRIPTION

Figure 1:
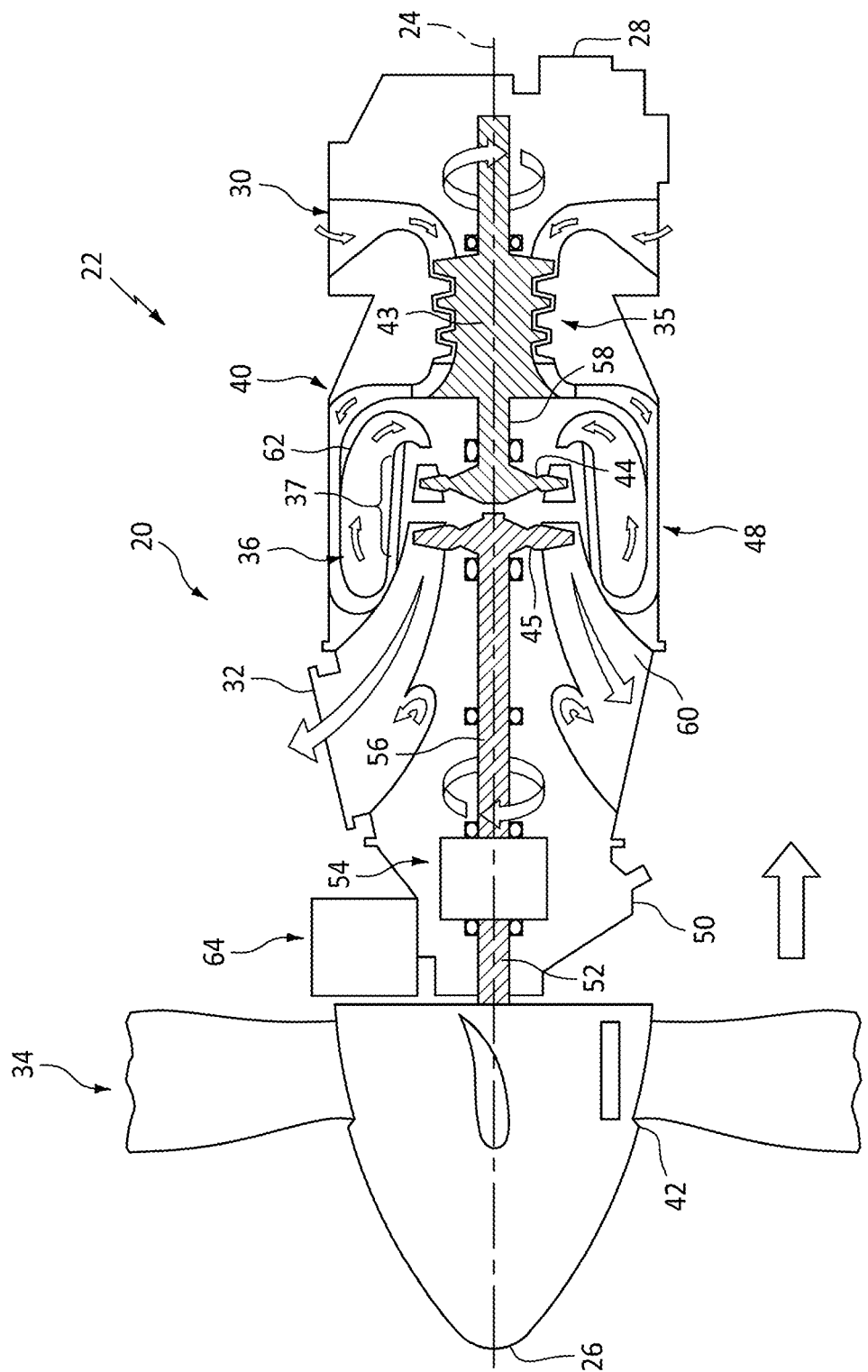
FIG. 1 is a schematic cross-section view of an aircraft engine.

FIG. 1 illustrates a gas turbine engine 20 of an aircraft powerplant herein exemplified as propulsion system 22. The gas turbine engine 20 of FIG. 1 is configured as a turboprop engine. The gas turbine engine 20 extends axially along a centerline axis 24 between a forward end 26 of the gas turbine engine 20 and an aft end 28 of the gas turbine engine 20. The gas turbine engine 20 of FIG. 1 includes an airflow inlet 30, a combustion products exhaust 32, a propulsor (e.g., a propeller) section 34, a compressor section 35, a combustor section 36 and a turbine section 37.

The airflow inlet 30 is located towards the engine aft end 28, and aft of the compressor section 35. The exhaust 32 is located towards the engine forward end 26, and axially between the propulsor section 34 and a core 40 the gas turbine engine 20. Here, the engine core 40 includes the compressor section 35, the combustor section 36 and the turbine section 37. This engine core 40 is configured to power operation of the propulsor section 34 as described below in further detail.

The propulsor section 34 includes a propulsor rotor 42; e.g., a propeller. The compressor section 35 includes a compressor rotor 43. The turbine section 37 includes a high pressure turbine (HPT) rotor 44 and a low pressure turbine (LPT) rotor 45, where the LPT rotor 45 may be referred to as a power turbine rotor. Each of these bladed engine rotors 43-45 includes a plurality of rotor blades arranged circumferentially about and connected to one or more respective rotor disks or hubs. The rotor blades, for example, may be formed integral with or mechanically fastened, welded, brazed, adhered and/or otherwise attached to the respective rotor disk(s) or hub(s).

The engine sections 35-37 and their respective bladed rotors 43-45 are housed within an engine housing 48. This engine housing 48 includes an engine case 50 which extends axially along and circumscribes the engine core 40 and its engine sections 35-37. The engine case 50 may be a segmented structure. The engine case 50, for example, may include a plurality of discrete (e.g., axial and/or circumferential) case segments mechanically fastened and interconnected together. The engine housing 48 and its engine case 50 may be arranged axially next to the propulsor rotor 42. The propulsor rotor 42 of FIG. 1, for example, is disposed outside of and axially forward of the engine housing 48 and its engine case 50.

The propulsor rotor 42 is operatively coupled to the LPT rotor 45. The propulsor rotor 42 of FIG. 1, for example, is connected to the LPT rotor 45 sequentially through a propulsor shaft 52, a geartrain 54 (e.g., an epicyclic geartrain, a transmission, etc.) and a low pressure shaft 56. The compressor rotor 43 is operatively coupled to the HPT rotor 44. The compressor rotor 43 of FIG. 1, for example, is connected to the HPT rotor 44 through a high pressure shaft 58. Here, at least the engine components 54, 56 and 58 of FIG. 1 are also housed within the engine housing 48 and its engine case 50.

During operation of the aircraft propulsion system 22, air enters the gas turbine engine 20 through the airflow inlet 30. This air is directed into a core flowpath 60 which extends sequentially from the airflow inlet 30, through the engine sections 35, 36 and 37, to the exhaust 32. The air entering the core flowpath 60 may be referred to as "core air". This core air is compressed by the compressor rotor 43 and directed into a combustion chamber of a combustor 62 in the combustor section 36. Fuel is injected into the combustion chamber and mixed with the compressed core air to provide a fuel-air mixture. This fuel-air mixture is ignited and combustion products thereof flow through and sequentially cause the HPT rotor 44 and the LPT rotor 45 to rotate. The rotation of the HPT rotor 44 drives rotation of the compressor rotor 43 and, thus, compression of air received from the airflow inlet 30. The rotation of the LPT rotor 45 drives rotation of the propulsor rotor 42. The rotation of the propulsor rotor 42 propels air outside of and axially along the gas turbine engine 20 and its engine housing 48 in an aft direction to provide forward aircraft thrust.

Figure 2:
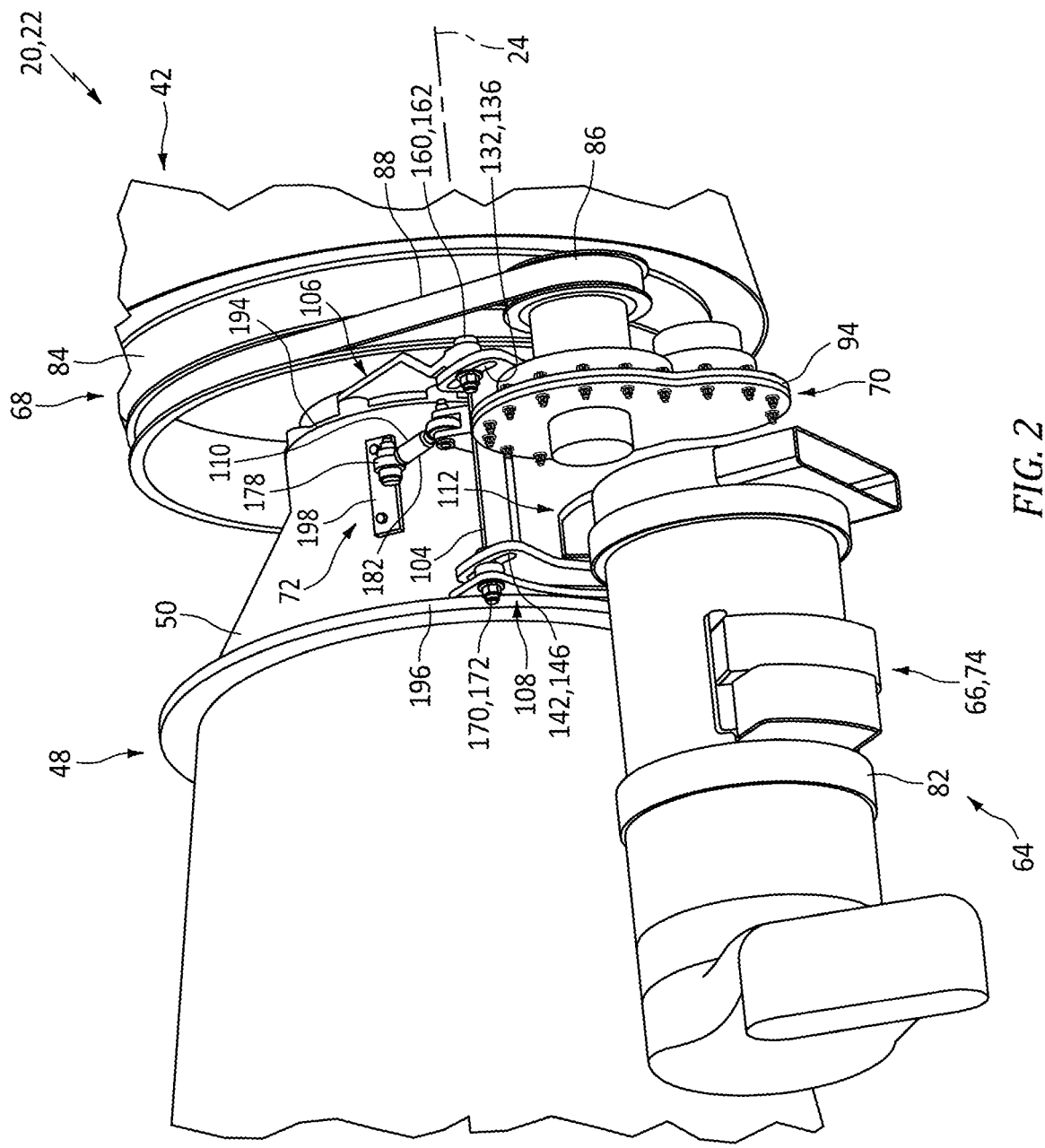
FIG. 2 is a partial perspective view of the aircraft engine including a mounting arrangement for mounting an electric machine and a gearbox to an engine housing of a gas turbine engine.

The aircraft propulsion system 22 of FIG. 1 also includes an auxiliary engine system 64; e.g., an engine accessory system. Referring to FIG. 2, the engine system 64 includes a mechanical load 66, a belt drive 68, a gearbox 70 and a mounting assembly 72.

The mechanical load 66 may be an accessory for propulsion system and/or aircraft operation. The mechanical load 66 of FIG. 3, for example, is configured as an electric machine 74, which may act as an electric generator or an electric motor. When used as an electric generator, the electric machine 74 is operable to convert mechanical power into electricity. This electricity may be utilized for various purposes within the aircraft propulsion system 22 (see FIGS. 1 and 2) and/or the aircraft more generally. The electricity, for example, may be provided to a component 76 for electrically powering operation of that component 76. The component 76, for example, may be an actuator, a controller, a pump, a motor or any other electrically powered device. Alternatively, the electricity may be provided to the component 76 for charging that component 76. The component 76, for example, may be a power storage device such as a battery or a battery bank. While FIG. 2 is shown with a single component electrically coupled to the electric machine 74, it is contemplated that multiple of such a component or various different components may be electrically coupled to the electric machine 74. When use as an electric motor, the electric machine 74 may be used to provide mechanical power to the propulsor rotor 42 or to any other component operatively connected therewith.

The electric machine 74 includes a rotor 78 and a stator 80. The electric machine 74 also includes a case 82 that at least partially or completely houses and supports the rotor 78 and the stator 80 within an internal volume; e.g., cavity, chamber, etc. This electric machine 74 may be configured as a radial flux electric machine where the stator 80 is radially outboard of and circumscribes the rotor 78. The present disclosure, however, is not limited to such an exemplary arrangement. The rotor 78, for example, may alternatively be radially outboard of and circumscribe the stator 80. In another example, the electric machine 74 may be configured as an axial flux electric machine where the rotor 78 is axially next to the stator 80. Moreover, the mechanical load 66 of the present disclosure is not limited to the foregoing exemplary configuration. The mechanical load 66, for example, may alternatively be configured as an air conditioning (A/C) compressor, a hydraulic pump, or a fluid pump (e.g., for an agricultural sprayer) to name a few.

The belt drive 68 is configured to operatively couple the propulsor rotor 42 to the gearbox 70 and, thus, the mechanical load 66. This belt drive 68 may be a two-pulley system. The belt drive 68 of FIG. 3, for example, includes a first pulley 84, a second pulley 86 and a tension member 88, such as an endless belt. The first pulley 84 is mounted (e.g., bolted and/or otherwise mechanically fastened) to and rotatable with the propulsor rotor 42, for example at (e.g., on, adjacent or proximate) an aft end of the propulsor rotor 42. The second pulley 86 is mounted to and rotatable with a first shaft 90 of the gearbox 70. The second pulley 86 of FIG. 3 has a smaller diameter than the first pulley 84; however, the present disclosure is not limited to such an exemplary arrangement. The tension member 88 is wrapped around and contacts and grips a contact region on an outer periphery of the first pulley 84 as well as a contact region on an outer periphery of the second pulley 86. With such an arrangement, the tension member 88 (when tensioned) is configured to transfer mechanical power from the first pulley 84 to the second pulley 86 and vice versa. Rotation of the first pulley 84 may thereby drive rotation of the second pulley 86 through rotation of the tension member 88 and vice versa.

The gearbox 70 is configured to operatively coupled the belt drive 68 to the mechanical load 66. This gearbox 70 may also be configured as a speed change device such as a speed multiplying device. The gearbox 70 of FIG. 3, for example, includes the first shaft 90, a second shaft 92, a gearbox case 94 and a geartrain 96 housed and supported within the gearbox case 94. The geartrain 96 of FIG. 3 includes a first gear 98 and a second gear 100. The first gear 98 is mounted to and rotatable with the first shaft 90. The second gear 100 is mounted to and rotatable with the second shaft 92. The second gear 100 of FIG. 3 has a smaller diameter than the first gear 98; however, the present disclosure is not limited to such an exemplary arrangement. One or more teeth of the second gear 100 are meshed with one or more teeth of the first gear 98. With such an arrangement, the geartrain 96 and its gears 98 and 100 are configured to transfer mechanical power from the first shaft 90 to the second shaft 92 and vice versa.

Figure 3:
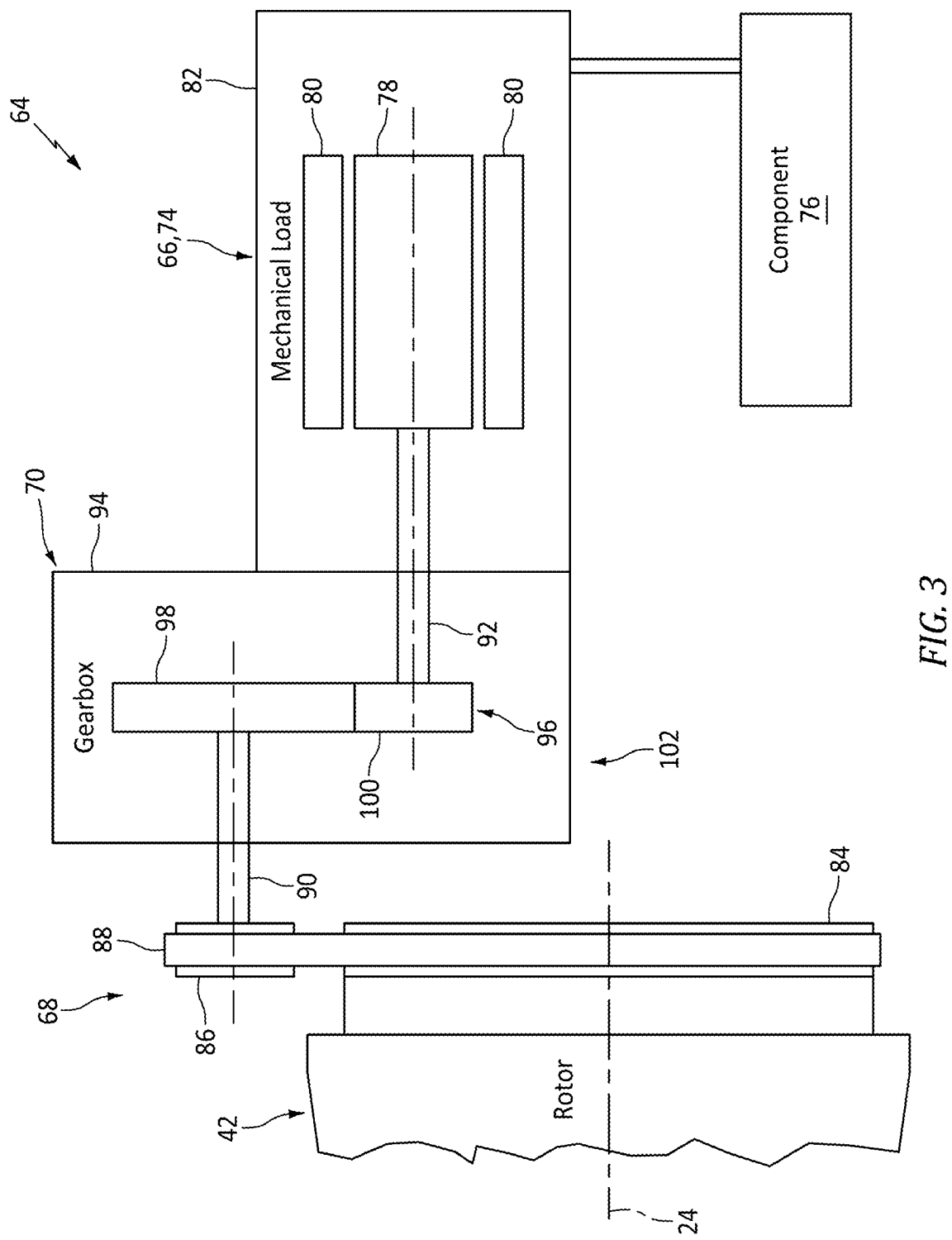
FIG. 3 is a schematic view of the electric machine operatively coupled to a rotor of the gas turbine engine via a belt drive.

The second shaft 92 of FIG. 3 is coupled to the electric machine rotor 78. With this arrangement, at least (or only) the belt drive 68 and the gearbox 70 form a drivetrain 102 between the propulsor rotor 42 and the electric machine 74 and its rotor 78. This drivetrain 102 is configured to transfer mechanical power between the propulsor rotor 42 and the rotor 78 of the electric machine 74. In a generator mode of the electric machine 74, the propulsor rotor 42 may thereby drive rotation of the rotor 78 to power operation of the electric machine as a generator through the drivetrain 102. In a motor mode, the rotor 78 of the electric machine 74 can provide mechanical power the propulsor rotor 42.

Figure 4:
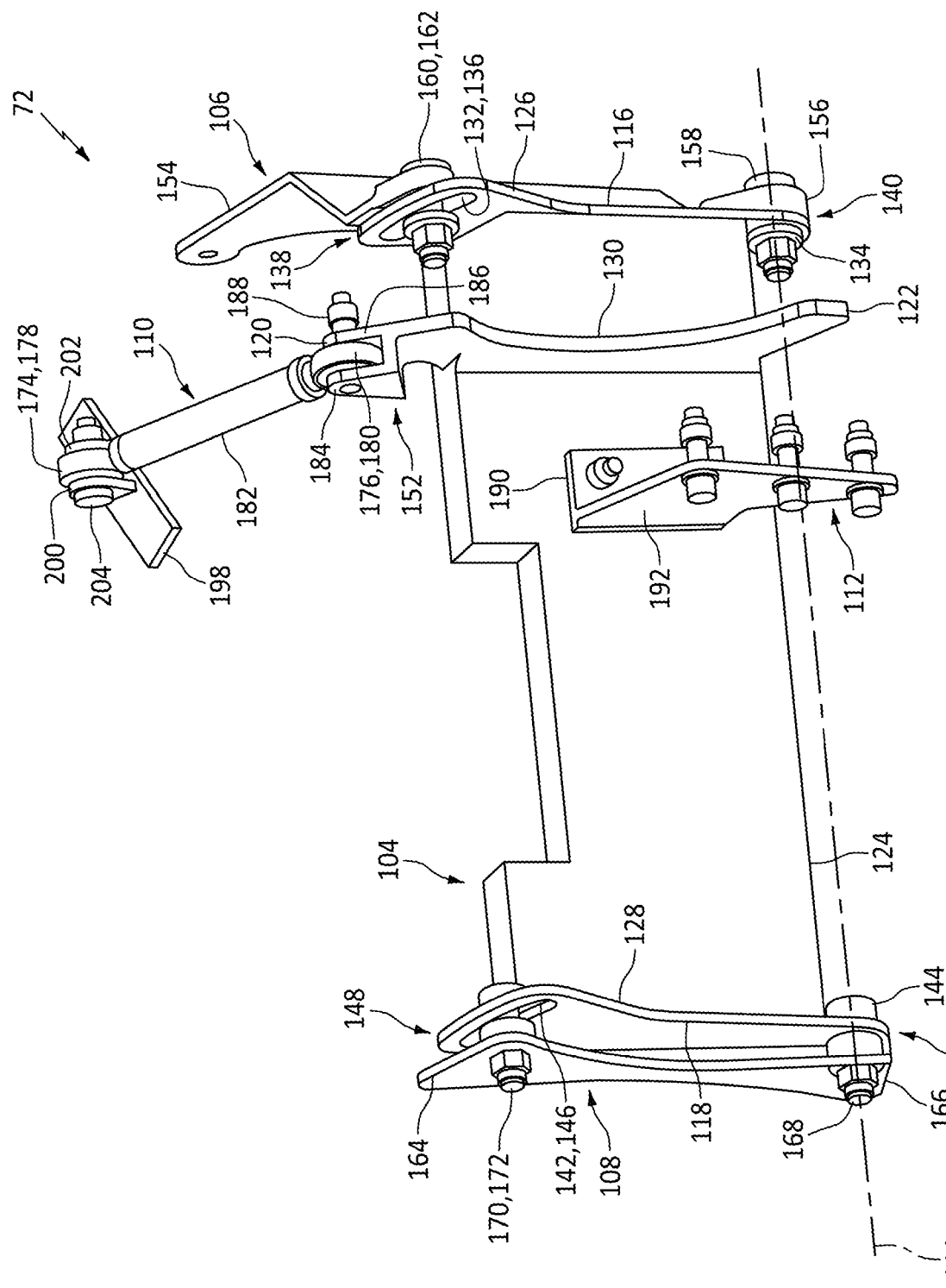
FIG. 4 is a perspective view of the mounting arrangement shown in FIG. 2.

Referring to FIG. 2, the mounting assembly 72 is configured to mount the mechanical load 66 (e.g. the electric machine 74) and the gearbox 70 to the engine housing 48 and its engine case 50. The mounting assembly 72 of FIG. 2 is also configured to adjust a tension of the tension member 88 of the belt drive 68 to facilitate (e.g., optimum, efficient, etc.) power transfer between the propulsor rotor 42 and the first shaft 90 (see FIG. 3) through the belt drive 68. Referring to FIG. 4, the mounting assembly 72 may include a support cradle 104, a forward mounting bracket 106, an aft mounting bracket 108 and a cradle adjustment link 110. The mounting assembly 72 of FIG. 4 may also include an intermediate support 112 such as a bracket, a stiffener, etc.

The support cradle 104 extends longitudinally along a longitudinal pivot axis 114 between and to a longitudinal forward end 116 of the support cradle 104 and a longitudinal aft end 118 of the support cradle 104. The support cradle 104 extends laterally (e.g., perpendicular to the pivot axis 114) between and to lateral first side 120 of the support cradle 104 and a lateral second side 122 of the support cradle 104. The support cradle 104 of FIG. 4 includes a cradle base 124, a forward cradle mount 126, an aft cradle mount 128 and an intermediate cradle mount 130.

The cradle base 124 may be configured as a structured plate. This cradle base 124 may provide a structural backbone for the support cradle 104. The cradle base 124 of FIG. 4 extends longitudinally between and to the forward cradle mount 126 and the aft cradle mount 128.

The forward cradle mount 126 is connected to (e.g., formed integral with or bonded to) the cradle base 124 at the cradle forward end 116. The forward cradle mount 126 may be configured as a flange which forms the cradle forward end 116. The forward cradle mount 126 of FIG. 4 includes a forward track 132 and a forward mounting aperture 134; e.g., a circular through hole. The forward track 132 may be arranged at a corner between the cradle forward end 116 and the cradle first side 120. The forward track 132 of FIG. 4 is configured as an arcuate slot 136. This forward mount slot 136 extends longitudinally through the forward cradle mount 126.

The forward mount slot 136 extends within the forward cradle mount 126 along an arcuate centerline (a major axis centerline) of that slot 136, which arcuate centerline extends circumferentially about (e.g., curved about) the pivot axis 114. The forward mount slot 136 of FIG. 4 is formed in a (e.g., unsupported, cantilevered) first portion 138 of the forward cradle mount 126 that projects laterally out from the cradle base 124 toward (or to) the cradle first side 120. The forward mounting aperture 134 may be arranged at a corner between the cradle forward end 116 and the cradle second side 122. This forward mounting aperture 134 extends longitudinally through the forward cradle mount 126 and is coaxial with the pivot axis 114. The forward mounting aperture 134 of FIG. 4 is formed in a (e.g., unsupported, cantilevered) second portion 140 of the forward cradle mount 126 that projects laterally out from the cradle base 124 toward (or to) the cradle second side 122.

The aft cradle mount 128 is connected to (e.g., formed integral with or bonded to) the cradle base 124 at the cradle aft end 118. The aft cradle mount 128 may be configured as a flange which forms the cradle aft end 118. The aft cradle mount 128 of FIG. 4 includes an aft track 142 and an aft mounting aperture 144; e.g., a circular through hole. The aft track 142 may be arranged at a corner between the cradle aft end 118 and the cradle first side 120. The aft track 142 of FIG. 4 is configured as an arcuate slot 146. This aft mount slot 146 extends longitudinally through the aft cradle mount 128. The aft mount slot 146 extends within the aft cradle mount 128 along an arcuate centerline (a major axis centerline) of that slot 146, which arcuate centerline extends circumferentially about (e.g., curved about) the pivot axis 114. The aft mount slot 146 of FIG. 4 is formed in a (e.g., unsupported, cantilevered) first portion 148 of the aft cradle mount 128 that projects laterally out from the cradle base 124 toward (or to) the cradle first side 120. The aft mounting aperture 144 may be arranged at a corner between the cradle aft end 118 and the cradle second side 122. This aft mounting aperture 144 extends longitudinally through the aft cradle mount 128 and is coaxial with the pivot axis 114 and the forward mounting aperture 134. The aft mounting aperture 144 of FIG. 4 is formed in a (e.g., unsupported, cantilevered) second portion 150 of the aft cradle mount 128 that projects laterally out from the cradle base 124 toward (or to) the cradle second side 122.

The intermediate cradle mount 130 is arranged longitudinally between and spaced from the forward cradle mount 126 and the aft cradle mount 128. The intermediate cradle mount 130 may be disposed longitudinally closer to the forward cradle mount 126 than the aft cradle mount 128 along the pivot axis 114. The intermediate cradle mount 130 is connected to (e.g., formed integral with or bonded to) the cradle base 124. The intermediate cradle mount 130 of FIG. 4 includes a clevis 152 at the cradle first side 120. This clevis 152 may be formed by a (e.g., unsupported, cantilevered) first portion of the intermediate cradle mount 130 that projects laterally out from the cradle base 124 to the cradle first side 120.

The forward mounting bracket 106 may be configured as a mounting plate or flange. The forward mounting bracket 106 extends laterally between and to a lateral first side 154 of the forward mounting bracket 106 and a lateral second side 156 of the forward mounting bracket 106. The forward mounting bracket 106 includes a first mounting aperture and a second mounting aperture, where each aperture may be a circular through hole. The first mounting aperture is disposed at the forward bracket first side 154. The second mounting aperture is disposed at the forward bracket second side 156.

The forward mounting bracket 106 is coupled to the support cradle 104 at the cradle forward end 116. In particular, the support cradle 104 and its forward mount second portion 140 are pivotally coupled (e.g., pinned) to the forward mounting bracket 106. A fastener 158 (e.g., a bolt, a bolt and nut, a pin, etc.), for example, may be mated with (e.g., extend through) the forward mounting aperture 134 and the forward bracket first mounting aperture. The support cradle 104 and its forward mount first portion 138 are also coupled to the forward mounting bracket 106. Another fastener 160 (e.g., a bolt, a bolt and nut, a pin, etc.), for example, may be mated with (e.g., extend through) the forward mount slot 136 and the forward bracket second mounting aperture. When this fastener 160 is loose, the fastener 160 is operable to move (e.g., translate, slide) along the forward mount slot 136. The fastener 160 may thereby form a slide 162 for the forward track 132. However, when the fastener 160 is tightened, the fastener 160 may fix a position of the support cradle 104 relative to the forward mounting bracket 106. It is contemplated the fastener 158 may also be tightened to further fix the position of the support cradle 104.

The aft mounting bracket 108 may be configured as a mounting plate or flange. The aft mounting bracket 108 extends laterally between and to a lateral first side 164 of the aft mounting bracket 108 and a lateral second side 166 of the aft mounting bracket 108. The aft mounting bracket 108 includes a first mounting aperture and a second mounting aperture, where each aperture may be a circular through hole. The first mounting aperture is disposed at the aft bracket first side 164. The second mounting aperture is disposed at the aft bracket second side 166.

The aft mounting bracket 108 is coupled to the support cradle 104 at the cradle aft end 118. In particular, the support cradle 104 and its aft mount second portion 150 are pivotally coupled (e.g., pinned) to the aft mounting bracket 108. A fastener 168 (e.g., a bolt, a bolt and nut, a pin, etc.), for example, may be mated with (e.g., extend through) the aft mounting aperture 144 and the aft bracket first mounting aperture. The support cradle 104 and its aft mount first portion 148 are also coupled to the aft mounting bracket 108. Another fastener 170 (e.g., a bolt, a bolt and nut, a pin, etc.), for example, may be mated with (e.g., extend through) the aft mount slot 146 and the aft bracket second mounting aperture. When this fastener 170 is loose, the fastener 170 is operable to move (e.g., translate, slide) along the aft mount slot 146. The fastener 170 may thereby form a slide 172 for the aft track 142. However, when the fastener 170 is tightened, the fastener may fix the position of the support cradle 104 relative to the aft mounting bracket 108. It is contemplated the fastener 168 may also be tightened to further fix the position of the support cradle 104.

The adjustment link 110 extends between and to a first end 174 of the adjustment link 110 and a second end 176 of the adjustment link 110. The adjustment link 110 has a variable length between the link first end 174 and the link second end 176. The adjustment link 110 may be configured as an eye-to-eye turnbuckle. This adjustment link 110 of FIG. 4, for example, includes a first turnbuckle eye 178, a second turnbuckle eye 180 and a turnbuckle body 182. The first turnbuckle eye 178 is disposed at the link first end 174, and the first turnbuckle eye 178 is threaded into a first end of the turnbuckle body 182. The second turnbuckle eye 180 is disposed at the link second end 176, and the second turnbuckle eye 180 is threaded into a second end of the turnbuckle body 182. This second turnbuckle eye 180 is pivotally coupled to the intermediate cradle mount 130 and its intermediate mount first portion. The second turnbuckle eye 180, for example, is disposed between forks 184 and 186 (e.g., flanged, tabs, etc.) of the clevis 152. A fastener 188 (e.g., a bolt, a bolt and nut, a pin, etc.) projects sequentially through the first fork 184, the second turnbuckle eye 180 and the second fork 186.

The intermediate support 112 may have an L-shaped geometry. The intermediate support 112 of FIG. 4, for example, includes a support base 190 and a support arm 192 projecting out from and angularly offset from (e.g., perpendicular to) the support base 190. The intermediate support 112 and its support base 190 are mechanically fastened (e.g., bolted) or otherwise attached to the support cradle 104 and its cradle base 124. The intermediate support 112 of FIG. 4 is disposed longitudinally between the aft cradle mount 128 and the intermediate cradle mount 130. The intermediate cradle mount 130 is disposed longitudinally between the intermediate support 112 and the forward cradle mount 126. The intermediate support 112 may be disposed longitudinally closer to the forward cradle mount 126 than the aft cradle mount 128 along the pivot axis 114.

Figure 5:
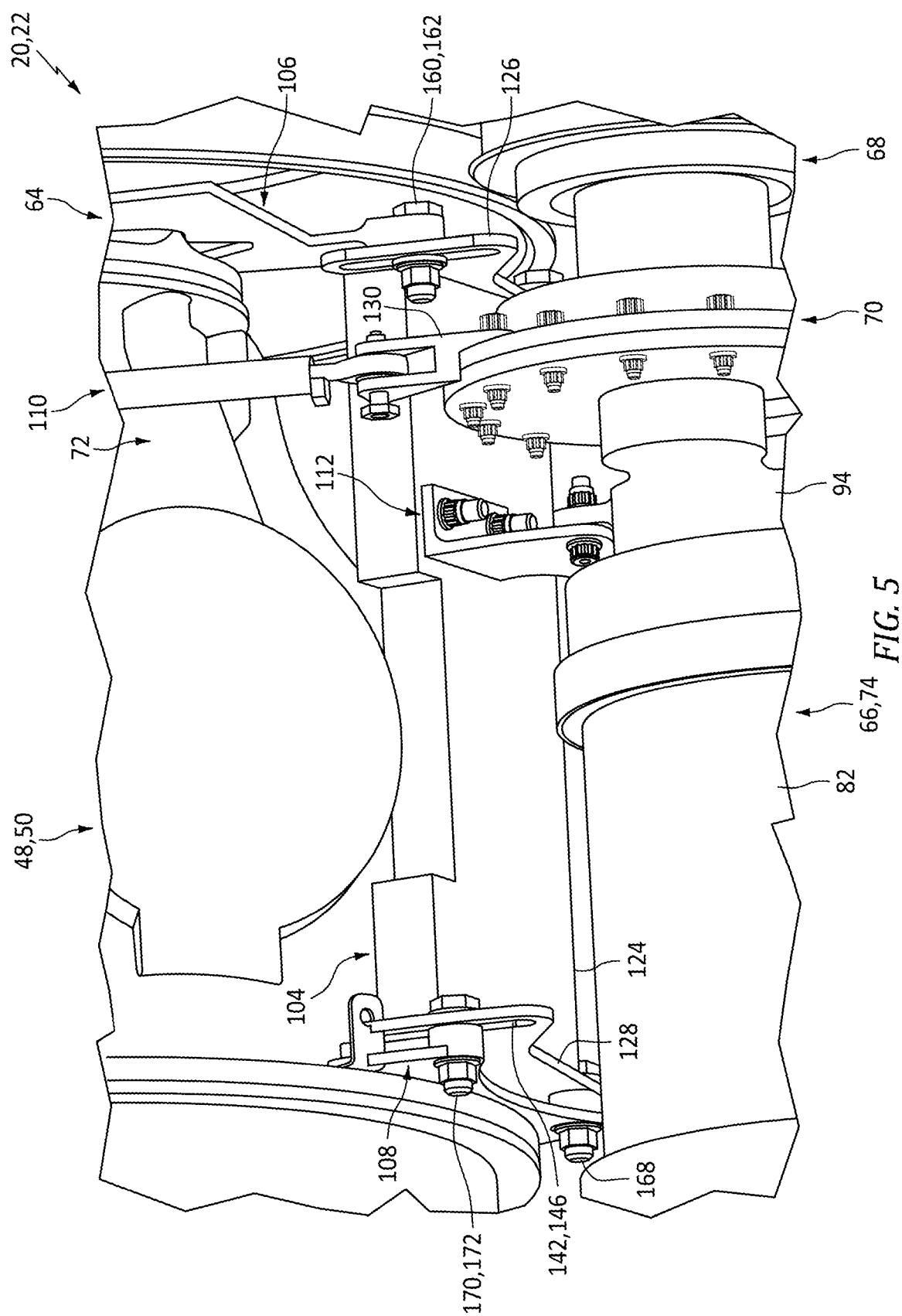
FIGS. 5 and 6 are partial perspective views of the mounting arrangement for mounting the electric machine and a gearbox to an engine housing of a gas turbine engine.
Figure 6:
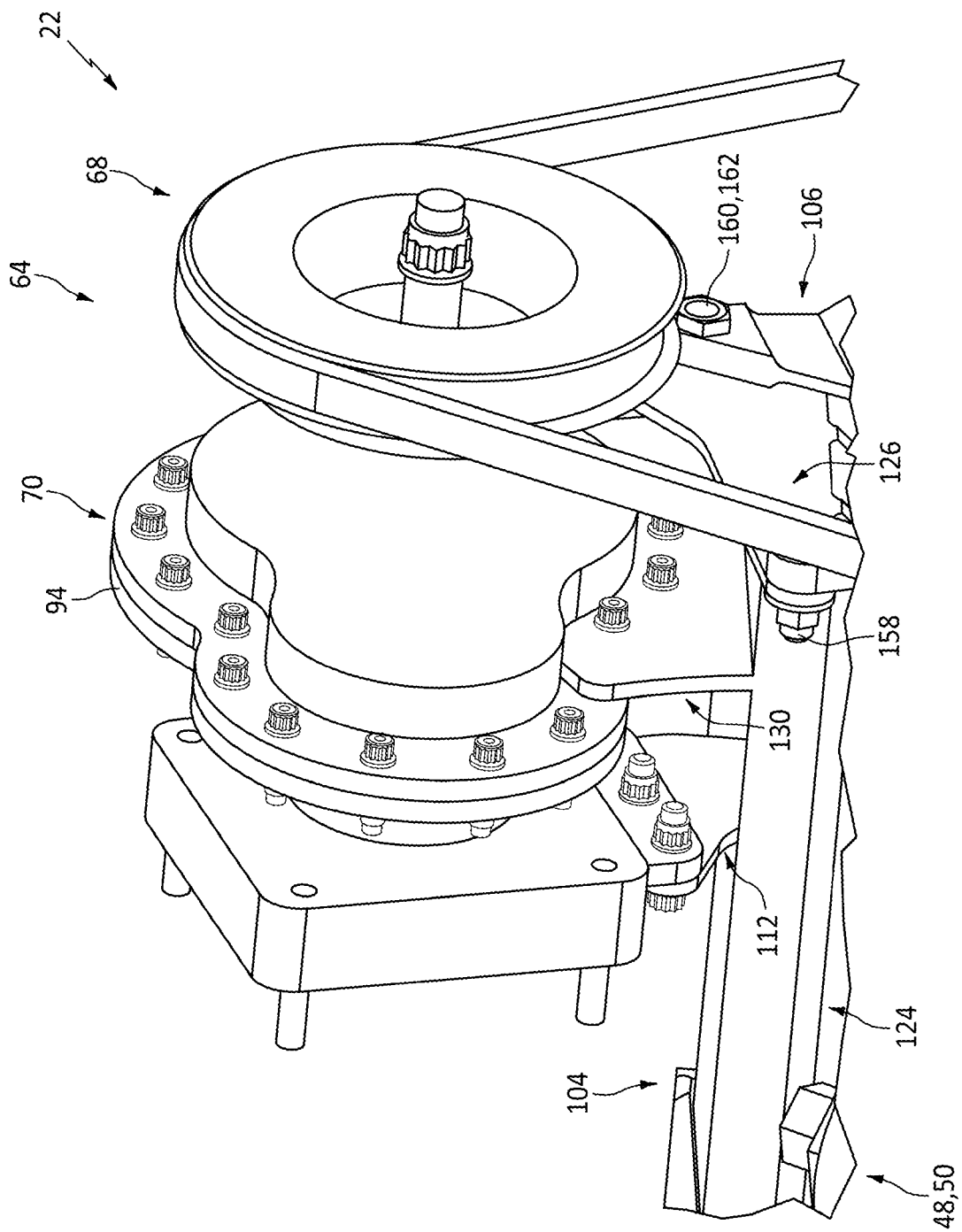

Referring to FIG. 2, the mechanical load 66 (e.g. the electric machine 74) and the gearbox 70 are mounted to the mounting assembly 72. For example, referring to FIGS. 5 and 6, the gearbox 70 is fixedly coupled to the intermediate cradle mount 130 and the intermediate support 112. The gearbox 70 of FIGS. 5 and 6 and its gearbox case 94, for example, are mechanically fastened (e.g., bolted) or otherwise attached to the intermediate cradle mount 130 and the intermediate support 112. The electric machine 74 of FIG. 5 may be fixedly attached to the support cradle 104 through the gearbox 70. The electric machine 74 of FIG. 5 and its case 82, for example, are mechanically fastened (e.g., bolted) or otherwise attached to the gearbox 70 and its gearbox case 94. The electric machine 74 may thereby be cantilevered from the gearbox 70. However, it is contemplated the electric machine 74 and its case 82 may also or alternatively be attached (e.g., independent of the gearbox 70) to the support cradle 104.

Referring to FIG. 2, the forward mounting bracket 106, the aft mounting bracket 108 and the adjustment link 110 are each coupled to the engine housing 48 and its engine case 50. The forward mounting bracket 106 and the aft mounting bracket 108, more particularly, are fixedly coupled to the engine housing 48 and its engine case 50. The forward mounting bracket 106 of FIG. 2, for example, is mechanically fastened (e.g., bolted) or otherwise attached to a forward mount 194 (e.g., a forward flange, rim or boss) of (or on) the engine housing 48 and its engine case 50. The aft mounting bracket 108 of FIG. 2 is mechanically fastened (e.g., bolted) or otherwise attached to an aft mount 196 (e.g., an aft flange, rim or boss) of (or on) the engine housing 48 and its engine case 50. The adjustment link 110, by contrast, is pivotally coupled to the engine housing 48 and its engine case 50. More particularly, the first turnbuckle eye 178 of FIG. 2 is pivotally coupled to a link bracket 198 which is fixed to (or alternatively formed part of) the engine housing 48 and its engine case 50. For example, referring to FIG. 4, the first turnbuckle eye 178 is disposed between forks 200 and 202 (e.g., flanged, tabs, etc.) of a clevis of the link bracket 198. A fastener 204 (e.g., a bolt, a bolt and nut, a pin, etc.) projects sequentially through the first fork 200, the first turnbuckle eye 178 and the second fork 202.

With the arrangement of FIG. 2, the mounting assembly 72 is operable to adjust the tension of the tension member 88. For example, the turnbuckle body 182 of the adjustment link 110 may be turned a first direction to increase the length of the adjustment link 110 and tighten the tension of the tension member 88. Alternatively, the turnbuckle body 182 of the adjustment link 110 may be turned a second direction (opposite the first direction) to decrease the length of the adjustment link 110 and loosen the tension of the tension member 88. As the length of the adjustment link 110 is changed, a distance between the support cradle 104 and the engine housing 48 changes and the support cradle 104 and, thus, the attached components (e.g., 66, 70, 74) pivot about the pivot axis 114 (see FIG. 4). Increasing the length of the adjustment link 110 increases the distance between the support cradle 104 and the engine housing 48 such that the support cradle 104 and the attached components (e.g., 66, 70, 74) pivot outward and away from the engine housing 48. Decreasing the length of the adjustment link 110 decreases the distance between the support cradle 104 and the engine housing 48 such that the support cradle 104 and the attached components (e.g., 66, 70, 74) pivot inwards and towards from the engine housing 48. This pivoting movement is guided by the movement of the slides 162, 172 along the tracks 132, 142. However, following this adjustment, the fasteners 160, 170 may be tightened to maintain the set tension of the tension member 88.

In some embodiments, referring to FIG. 4, each of the mounting assembly components (e.g., 104, 106, 108, 112) may be formed as a discrete monolithic body. The term "monolithic" may describe a component that is cast, machined, additively manufactured and/or otherwise formed as a single, unitary body. The present disclosure, however, is not limited to such an exemplary construction.

The terms "forward" and "aft" are used herein to orientate the components of the engine system 64 described above relative to the gas turbine engine 20 and its axis 24. However, it is contemplated one or more of these components may alternatively be utilized in other orientations than those described above. The present disclosure therefore is not limited to the foregoing exemplary engine system spatial arrangement.

The engine system 64 may be configured with various gas turbine engines other than the one described above. The engine system 64, for example, may be configured with a turbofan engine, a turbojet engine, a turboprop engine, a turboshaft engine, a propfan engine, a pusher fan engine or any other type of gas turbine engine. The present disclosure therefore is not limited to any particular types or configurations of gas turbine engines. Moreover, while the belt drive 68 is described above as being coupled to the propulsor rotor 42 (e.g., the propeller rotor) of FIG. 1, it is contemplated the belt drive 68 may alternatively be coupled to various other turbine engine rotors, bladed or not.

Figure 7:
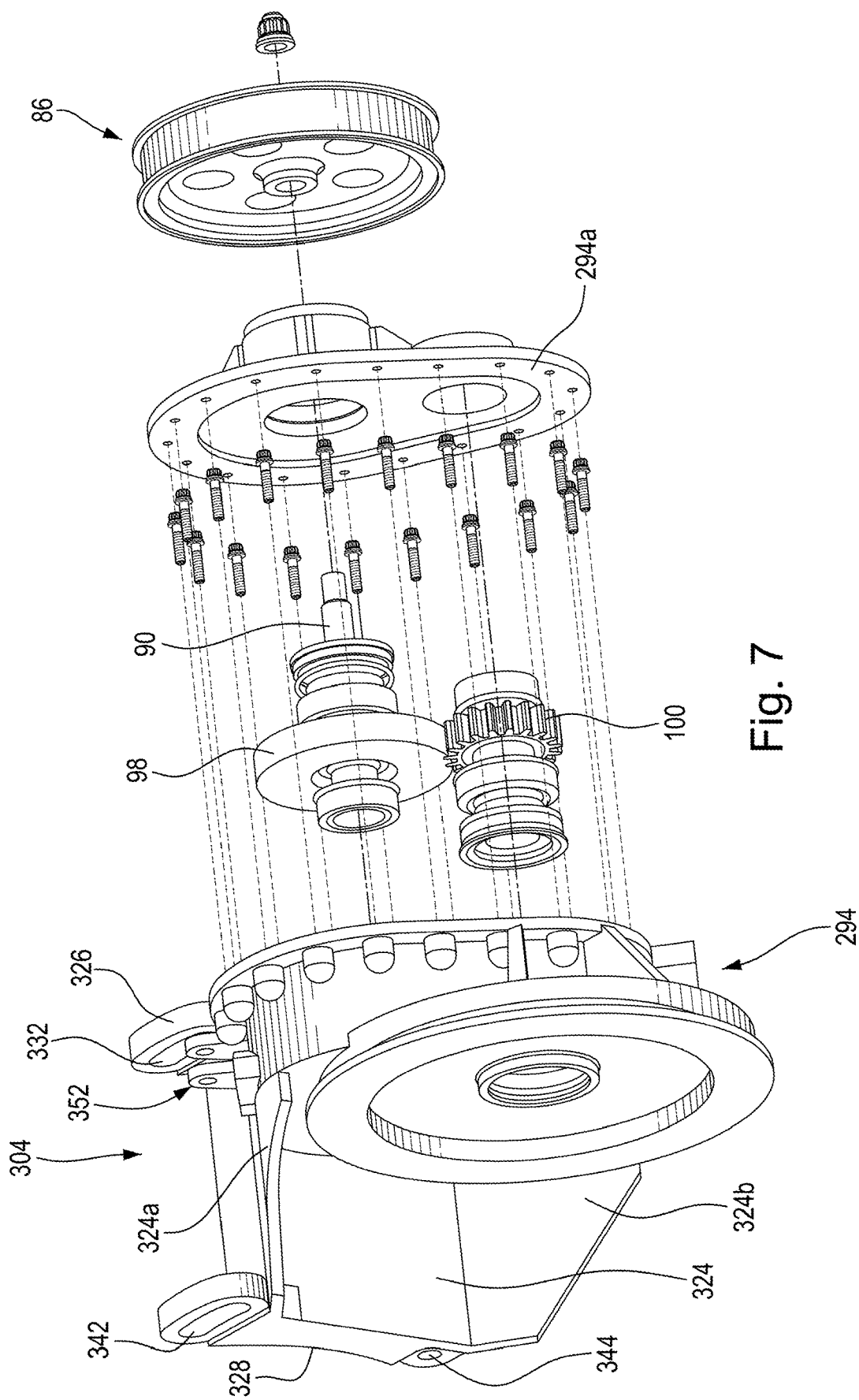
FIG. 7 is an exploded perspective view illustrating a mounting arrangement comprising a support cradle integrated to a gearbox housing to form a monolithic body therewith.

As illustrated in FIG. 7, it is also contemplated to integrate the cradle to the gearbox case to provide for a monolithic cradle/gearbox case body. For instance, the cradle and the gearbox case can be cast, machined or otherwise suitably manufactured as a unitary/one-piece body. Such a unitary component comprises a gearbox case 294 and a cradle 304 projecting integrally laterally from one side of a circumferentially extending wall of the gearbox case 294. Like the support cradle 104, the integrated cradle 304 comprises first and second cradle mounts 326, 328 disposed at opposed longitudinal ends of a structural/backbone plate 324 for connection to the mounting brackets 106, 108 on the engine housing 48 and its associated casing 50. The first cradle mount 326 may be positioned axially at or adjacent to the open end of the gearbox case 294. The structural plate 324 may project integrally from the gearbox case 294 axially beyond the closed second end of the gearbox case 294 (i.e., the end of the gearbox case 294 which provides a mounting interface for the electric machine 74) so that the second cradle mount 328 is axially spaced from the closed second end of the gearbox case 294. Accordingly, when the electric machine 74 is bolted or otherwise suitably mounted to the second end of the gearbox case 294, the second cradle mount 328 is axially disposed at an intermediate location between the axially opposed ends of the electric machine 74.

The first and second cradle mounts 326, 328 may have a configuration similar to that of cradle mounts 126, 128 of the support cradle 104. That is the cradle mounts 326, 328 may have respective lower pivot apertures (see for instance pivot aperture 344 of cradle mount 328 in FIG. 7) for pivotally mounting the combined cradle/gearbox case component to the mounting brackets 106 and 108 on the engine housing 48 and respective upper arcuate tracks 342 and 332 for engagement with corresponding fasteners/slider 160,162 and 170, 172 for guiding and limiting the extent of the pivotal movement of the combined cradle/gearbox case component relative to mounting brackets 106, 108 and, thus, the engine housing 48.

Stiffeners 324a,b may project from the upper and lower ends of the structural/backbone plate 324 to the gearbox case 294 so as to increase the overall stiffness of the integrated cradle/gearbox case component. The stiffeners 324a, 324b may be provided in the form of plates integrally formed with the cradle 304 and the gearbox housing 294.

The clevis 352 for connection to the adjustment link 110 may be formed directly on the outer surface of the circumferential wall of the gearbox case 294 axially between the first and second cradle mounts 326, 328 of the cradle 34.

A flange may be provided at the open end of the gearbox case 294 for connection with a mating flange of a gearbox cover 294a. As illustrated in FIG. 7, the gearbox case 294 and the gearbox cover 294a may be configured to provide for a bolted flange connection.

The integration of the cradle 304 and gearbox case 294 into a monolithic body provides for a lighter mounting assembly because less attachments are needed to install the electric machine 74, the gearbox 70 and the belt drive 68 on the engine. Notably, it eliminates the need for the intermediate mount 112 (FIG. 4). Also the assembly procedure and the adjustment of the tension in the tension member 88 are facilitated by the integration of the cradle to the gearbox case. Such a component integration also contributes to reduce stack up tolerances and, thus, it provides for a more accurate assembly/installation of the auxiliary engine system 64. The electric machine 74 can be supported on the engine housing 48 via the monolithic body formed by the cradle and the gearbox case. That is all the load from the electric machine may be transferred to the engine housing through the monolithic body. In this way, the electric machine 74 can extend in a cantilevered fashion from the monolithic body.

The embodiments described in this document provide non-limiting examples of possible implementations of the present technology. Upon review of the present disclosure, a person of ordinary skill in the art will recognize that changes may be made to the embodiments described herein without departing from the scope of the present technology.

The invention claimed is:

1. An assembly for an aircraft engine, comprising:
an engine case having an exterior surface with a first and a second mounting bracket projecting from the exterior surface;
a rotor next to the engine case;
an auxiliary engine system including: an electric machine, a belt drive operatively coupled to the rotor, and a gearbox operatively coupled between the belt drive and the electric machine, the gearbox having a gearbox case with a cradle integrated thereto, the gearbox case and the cradle forming a monolithic body, the monolithic body pivotally mounted to the first and second mounting brackets;
an adjustment link between the engine case and the monolithic body, a length of the adjustment link adjustable to adjust a tension of the belt drive by setting an angular position of the monolithic body relative to the engine case.

2. The assembly of claim 1, wherein the monolithic body comprises a clevis projecting integrally from an outer surface of the gearbox case, the adjustment link having a first end pivotally connected to the clevis and a second end pivotally connected to the engine case.

3. The assembly of claim 2, wherein the adjustment link comprises a turnbuckle.

4. The assembly of claim 1, wherein the monolithic body comprises a pair of stiffeners integrated between the cradle and the gearbox case.

5. The assembly of claim 4, wherein the pair of stiffeners comprises an upper stiffener plate and a lower stiffer plate extending respectively from an upper end and a lower end of a base plate of the cradle, the base plate projecting axially beyond an end of the gearbox case.

6. The assembly of claim 5, wherein the cradle comprises a first cradle mount and a second cradle mount, the first and second cradle mounts disposed at opposed ends of the base plate.

7. The assembly of claim 6, wherein the first and second cradle mounts respectively include a first track and a second track, the first and second tracks extending about an arc of circle about a pivot axis of the monolithic body, the first and second tracks respectively engaged with first and second slides projecting from the first and second mounting brackets, respectively.

8. The assembly of claim 7, wherein the first and second tracks are respectively provided in the form of a first and a second arcuate slot.

9. The assembly of claim 8, wherein the first and second slides respectively comprise first and second fasteners respectively projecting through the first and second arcuate slots, the first and second fasteners configured to tighten against the cradle to fix a position of the cradle relative to the engine case.

10. The assembly of claim 1, wherein the electric machine extends in a cantilevered fashion from the monolithic body.

11. The assembly of claim 1, wherein the rotor comprises a propeller, the propeller operatively connected to the electric machine via the belt drive and the gearbox.

12. The assembly of claim 1, further comprising a turbine operatively connected to the rotor, the turbine and the electric machine operable to jointly drive the rotor in rotation.

13. An assembly for an aircraft propulsion system, comprising:
   an engine case housing a turbine;
   a rotor drivingly connected to the turbine for rotation about an engine axis; and
   an auxiliary engine system externally mounted to the engine case, the auxiliary engine system comprising an electric machine, a gearbox operatively connected to the electric machine, a belt drive operatively connecting the gearbox to the rotor;
   wherein a cradle is integrated to a gearbox case of the gearbox to form therewith a monolithic body, the monolithic body pivotally mounted to the engine case for pivotal movement about a pivot axis, and wherein an adjustable link is connected at a first end to the engine case and at a second end to the monolithic body at a location spaced from the pivot axis, a length of the adjustable link adjustable to adjustably set an angular position of the monolithic body about the pivot axis.

14. The assembly of claim 13, wherein the monolithic body comprises a clevis projecting integrally from an outer surface of the gearbox case, the adjustment link having a first end pivotally connected to the clevis and a second end pivotally connected to the engine case.

15. The assembly of claim 13, wherein the monolithic body comprises a pair of stiffeners integrated between the cradle and the gearbox case.

16. The assembly of claim 15, wherein the pair of stiffeners comprises an upper stiffener plate and a lower stiffer plate extending respectively from an upper end and a lower end of a base plate of the cradle, the base plate projecting axially beyond an end of the gearbox case.

17. The assembly of claim 16, wherein the cradle comprises a first cradle mount and a second cradle mount, the first and second cradle mounts disposed at opposed ends of the base plate.

18. The assembly of claim 17, wherein the first and second cradle mounts respectively include a first track and a second track, the first and second tracks extending about an arc of circle about the pivot axis of the monolithic body, the first and second tracks respectively engaged with first and second slides mounted to the engine case.

19. The assembly of claim 13, wherein the electric machine is mounted to the engine case via the monolithic body.

20. The assembly of claim 13, wherein the electric machine is cantilevered from the monolithic body.

* * * * *